UNITED STATES PATENT OFFICE.

ALFRED PEARL BOON, OF ST. CHRISTOPHER, WEST INDIES, ASSIGNOR TO CHARLES HENRY BOON, OF SAME PLACE.

CONCENTRATION AND EVAPORATION OF SIRUPS.

SPECIFICATION forming part of Letters Patent No. 295,342, dated March 18, 1884.

Application filed February 21, 1884. (No specimens.)

*To all whom it may concern:*

Be it known that I, ALFRED PEARL BOON, a subject of the Queen of Great Britain, and residing in the Island of St. Christopher, in the West Indies, have invented a new and useful Process for the Concentration and Evaporation of Sirups in the Manufacture of Sugar from Cane-Juices, of which the following is a specification.

This invention relates to that class of processes of concentration and evaporation where the same is effected by the agency of heat.

The object of my invention is to effect the concentration and evaporation of the sirups more rapidly and more effectually at a low temperature than heretofore, and to thereby greatly diminish the expense.

More than thirty years ago Kneller proposed to concentrate sirups by forcing cold air through them in a constant stream. Fryer in his concretor followed this idea to some extent, for in the apparatus referred to he caused a current of hot air to pass over the surface of sirups spread out on thin sheets of perforated iron. Now, I have discovered that when air is heated to a high temperature and is forced or injected in an extremely fine state of division into a body of sirup, or is driven through the same and then allowed to escape, the fine bubbles of heated air will absorb a much larger amount of aqueous vapor than if cold air is used, and the result will be a very rapid evaporation of the sirups at a very low temperature. The capability of the sirups for evaporation will be very greatly increased, and much better results will be obtained, and the process of evaporation much more readily regulated and controlled than in the ordinary methods.

For the purposes of my invention I provide any convenient form of vessel or receptacle. The sirups not necessarily being heated, an ordinary boiler, or even a wooden cask, may be used. The hot air is injected or forced into the sirup in the form of a series of very fine jets, and at any convenient pressure varying from six to one hundred pounds per square inch, according to the size of the column of liquid to be traversed. I force the air vertically through the body of liquid to be concentrated to the bottom of the vessel and then allow it to escape. The column may be from ten to twenty feet in height.

The temperature of the air may be regulated by any suitable form of mechanical contrivance, such as a valve, controlled by an electric thermometer with double ports—one for lowering the temperature by letting in cold air, the other for raising the temperature by letting hot air in.

The advantages of thus causing the heated air to twice traverse the column of sirup are very great. A more thorough intermingling of the air with the sirup is effected than by simply forcing air into the column, and then allowing it to find its way out of the liquid, and more perfect evaporation of heat is effected. It is possible to force the heated air into the column of liquid at its bottom or in any other convenient way; but the results obtained are not so satisfactory.

I claim as my invention—

1. The hereinbefore-described process of concentrating and evaporating sirups, consisting in pumping or injecting heated air at a high pressure and in an extremely fine state of division into the same, substantially as specified.

2. The hereinbefore-described process of concentrating and evaporating sirups, consisting in pumping or injecting heated air at a high pressure and in an extremely fine state of division into the same, and allowing the air to escape, substantially as described.

3. The hereinbefore-described process of concentrating and refining sirups, consisting in pumping or injecting heated air at a high pressure and in an extremely fine state of division into a column of the same, and allowing it to escape, substantially as specified.

4. The hereinbefore-described process of concentrating and refining sirups, consisting in pumping or injecting heated air at a high pressure and in an extremely fine state of division vertically through a column of the same, and allowing the air to escape by passing vertically up through the body of the liquid, substantially as specified.

In testimony whereof I have hereunto subscribed my name this 12th day of February, A. D. 1884.

ALFRED PEARL BOON.

Witnesses:
F. E. WATSON,
C. H. BOON.